US012710383B2

(12) United States Patent
De Vries et al.

(10) Patent No.: US 12,710,383 B2
(45) Date of Patent: Aug. 18, 2026

(54) X-RAY DETECTOR FOR X-RAY DIFFRACTION ANALYSIS APPARATUS

(71) Applicant: Malvern Panalytical B.V., Almelo (NL)

(72) Inventors: Roelof De Vries, Almelo (NL); Sander Weijers, Almelo (NL)

(73) Assignee: Malvern Panalytical B.V., Almelo (NL)

( * ) Notice: Subject to any disclaimer, the term of this patent is extended or adjusted under 35 U.S.C. 154(b) by 134 days.

(21) Appl. No.: 18/021,297

(22) PCT Filed: Aug. 24, 2021

(86) PCT No.: PCT/EP2021/073425
§ 371 (c)(1),
(2) Date: Feb. 14, 2023

(87) PCT Pub. No.: WO2022/043340
PCT Pub. Date: Mar. 3, 2022

(65) Prior Publication Data
US 2023/0296538 A1 Sep. 21, 2023

(30) Foreign Application Priority Data
Aug. 24, 2020 (EP) .................................... 20192506

(51) Int. Cl.
*G01N 23/2055* (2018.01)
*G01N 23/20016* (2018.01)

(52) U.S. Cl.
CPC ... *G01N 23/2055* (2013.01); *G01N 23/20016* (2013.01); *G01N 2223/317* (2013.01); *G01N 2223/408* (2013.01)

(58) Field of Classification Search
CPC ....... A61B 6/4283; G01T 1/243; G01T 1/247; G01T 1/2928; G01T 1/17; G01T 1/244;
(Continued)

(56) References Cited

U.S. PATENT DOCUMENTS 6,697,453 B1 * 2/2004 Mueller ............... G01N 23/207 378/81
9,024,268 B2 * 5/2015 Durst ................... H10F 30/301 250/370.01
(Continued)

FOREIGN PATENT DOCUMENTS

CN 104655662 A 5/2015
CN 109991253 A 7/2019
(Continued)

OTHER PUBLICATIONS

"European Search Report and Written Opinion," European Application No. 20192506.2-1001, Date of Mailing: Mar. 2, 2021, pp. 1-12.
(Continued)

*Primary Examiner* — David J Makiya
*Assistant Examiner* — Soorena Kefayati
(74) *Attorney, Agent, or Firm* — Cesari and McKenna, LLP

(57) ABSTRACT

An X-ray detector for an X-ray diffraction analysis apparatus comprises a sensor, a readout circuit, a processor and a display output for communicating a display signal to a display device. The sensor detects X-ray photons by converting an X-ray photon incident on the sensor into a sensor output signal. The readout circuit receives the sensor output signal from the sensor and determines an X-ray photon count, by counting the sensor output signal. The processor is configured to calculate an X-ray intensity value using the X-ray photon count, and to generate a display signal for displaying an image representing the X-ray intensity value. The display output is configured to communicate the display signal to a display device for displaying the X-ray intensity value.

15 Claims, 6 Drawing Sheets

(58) Field of Classification Search
CPC . G01T 1/2985; G01T 1/241; G01N 2223/317; G01N 2223/408; G01N 23/20016; G01N 23/2055
See application file for complete search history.

(56) References Cited

U.S. PATENT DOCUMENTS

2005/0190881 A1* 9/2005 Obata ............ G01N 23/20016 378/87
2006/0083350 A1* 4/2006 Gerndt ............ G01N 23/20 378/70
2008/0112535 A1* 5/2008 Wojcik ............ G01T 1/244 250/366
2009/0310748 A1* 12/2009 Kawabe ............ G01N 23/2252 378/82
2011/0200164 A1* 8/2011 Blaj ............ G01N 23/207 378/4
2011/0268251 A1* 11/2011 He ............ G01N 23/207 378/71
2011/0317813 A1* 12/2011 Matsushita ............ H01J 35/10 378/70
2015/0146859 A1* 5/2015 Kakefuda ............ G01N 23/207 378/75
2015/0146861 A1* 5/2015 Kobayashi ............ G01N 23/207 378/79
2016/0070006 A1* 3/2016 Konkle ............ H04N 23/30 250/366
2016/0345920 A1* 12/2016 Tajima ............ A61B 6/5294
2016/0356729 A1* 12/2016 Bauer ............ H01J 37/20
2017/0164916 A1* 6/2017 Kosuge ............ A61B 6/465
2017/0168172 A1* 6/2017 Crosby ............ G01T 1/40
2017/0299528 A1* 10/2017 Ogata ............ G01N 23/223
2020/0326290 A1* 10/2020 Iniewski ............ G01N 23/20008
2021/0033546 A1* 2/2021 He ............ G01N 23/2055
2021/0166829 A1* 6/2021 Ito ............ G01N 23/20025
2021/0335866 A1* 10/2021 Hall ............ H10F 39/189
2022/0018791 A1* 1/2022 Sato ............ G01N 23/207
2022/0026377 A1* 1/2022 Yamamoto ............ G01N 23/2209

FOREIGN PATENT DOCUMENTS

| | | | |
|---|---|---|---|
| CN | 110494770 | A | 11/2019 |
| DE | 102013205461 | A1 | 10/2014 |
| JP | H07-218455 | A | 8/1995 |
| JP | 2005-221463 | A | 8/2005 |
| JP | 2011-169900 | A | 9/2011 |
| JP | 2012-013463 | A | 1/2012 |
| JP | 2014-521101 | A | 8/2014 |
| JP | 2020-039083 | A | 3/2020 |
| WO | 2012/015046 | A1 | 2/2012 |
| WO | 2020/105718 | A1 | 5/2020 |
| WO | 2020105716 | A1 | 5/2020 |

OTHER PUBLICATIONS

"PCT International Search Report and the Written Opinion of the International Searching Authority" International Filing Date: Aug. 24, 2021, International Application No. PCT/EP2021/073425, Date of Mailing: Nov. 15, 2021, pp. 1-13.

"X'PERT3 MRD Family: The Proven Choice for Thin Film Analysis," Malvern Panalytical, <https://www.malvernpanalytical.com/en/assets/XPert3MRDFamilyBrochure_tcm50-52127.pdf>, Jan. 1, 2014, pp. 1-9.

"X'PRESS : How to Develop?," Malvern Panalytical, PANalytical, <https://www.malvernpanalytical.com/en/assets/XPress_32016_tcm50-45937.pdf>, Issue 3, Jan. 1, 2016, pp. 1-16.

"English Translation of Japanese Office Action," Japanese Patent Office, Japanese Patent Application No. 2023-513148, Date of Mailing: Apr. 22, 2025, pp. 1-4.

"Chinese Office Action," Chinese Patent Office, Chinese Patent Application No. 202180052820.3, Dated: Jul. 28, 2025, pp. 1-39.

"Chinese Search Report for Chinese Patent Application No. 202180052820.3", dated Jul. 25, 2025, pp. 1-9.

* cited by examiner

X-RAY DETECTOR FOR X-RAY DIFFRACTION ANALYSIS APPARATUS

CROSS-REFERENCE TO RELATED APPLICATIONS

The present application is the National Stage of International Application No. PCT/EP2021/073425, filed on Aug. 24, 2021, which claims priority from European patent application No. 20192506.2 filed on Aug. 24, 2020, the disclosure of both of which should be understood to be incorporated into this specification.

FIELD OF THE INVENTION

The present invention relates to an X-ray detector for an X-ray diffraction analysis apparatus for analysing materials, an X-ray diffraction analysis apparatus and a method of using an X-ray diffraction analysis apparatus. In particular, the present invention relates to an X-ray detector for displaying X-ray diffraction information.

BACKGROUND

Some X-ray diffraction analysis apparatuses comprise an enclosure housing an X-ray source, a sample stage, a goniometer, and an X-ray detector. The enclosure is designed to protect users from X-rays during operation, by preventing X-rays scattered by the sample or the X-ray diffraction analysis apparatus from exiting the enclosure. Typically, various components of the X-ray analysis apparatus are assembled inside the enclosure, by an expert, when the X-ray diffraction analysis apparatus is manufactured. This ensures that the components of the X-ray analysis apparatus are properly aligned. It is particularly important to ensure the X-ray detector and X-ray source are properly aligned.

The X-ray analysis apparatus may comprise other components, for example collimators, or filters. These components may be mounted to actuators for moving the components in and out of the X-ray beam.

The components of the X-ray diffraction analysis apparatus are connected, by a wired connection, to a centralised system controller. The system controller controls the components and processes signals output by the X-ray detector. The system controller (the primary) has unidirectional control over each of the components, including the X-ray detector (the secondary). The system controller processes the signals from the X-ray detector to obtain measurement data, and stores the measurement data. It also communicates the measurement data to an external computer (e.g. a PC). That is, the system controller communicates the measurement data to a computer that is external to the enclosure. Users rely on X-ray analysis software, installed on the computer, to display and optionally interpret the measurement data. The X-ray analysis software can analyse the measurement data (for example, by identifying sets of peaks corresponding to crystalline phases) and display the analysis to the user.

In the event that the system is not working correctly, it would be desirable to be able to quickly and reliably identify what is causing the system to malfunction. Potential sources of error include: malfunction of one or more of the components of the X-ray analysis apparatus (e.g. the X-ray source, X-ray detector or system controller); a compromised connection between any one of the components and the system controller; or a compromised connection between the system controller and the external computer.

It would also be desirable to provide an X-ray analysis apparatus that can be conveniently aligned.

SUMMARY

According to an aspect of the invention, there is provided an X-ray detector for an X-ray diffraction analysis apparatus, the X-ray detector comprising: a sensor for converting an X-ray photon incident on the sensor into a sensor output signal; a readout circuit configured to determine an X-ray photon count, by counting the sensor output signal; and a processor configured to determine an X-ray intensity value, using the X-ray photon count, and to generate a display signal for displaying an image representing the X-ray intensity value. The X-ray detector further comprises a display output configured to communicate the display signal to a display device for displaying the image representing the X-ray intensity value.

The X-ray intensity value is determined by the X-ray detector, and the display signal is generated at the X-ray detector and can be output to the display device directly from the X-ray detector. The X-ray detector may comprise the display device. Alternatively, the X-ray detector may not comprise the display device. Accordingly, it is possible for a user to directly determine whether the X-ray detector is functioning correctly (without routing the measurement data output by the X-ray detector through a separate system controller).

Additionally, it is possible to obtain feedback on measurements very quickly. This can help to facilitate an operator to align the X-ray detector with other X-ray analysis apparatus components, such as the X-ray source. When a photon is incident on the sensor, the sensor generates an electrical current, resulting in a pulse (i.e. a sensor output signal). The readout circuit may comprise a digital counter for counting the pulses. The processor may determine an X-ray intensity value (e.g. counts per second) based on a count output by the readout circuit. The image representing the X-ray intensity value may represent the magnitude of the X-ray intensity value as a graphical image, rather than as text. Alternatively, the image may be textual.

The X-ray detector may further comprise: an environmental sensor configured to measure an environmental parameter; and a non-volatile memory, wherein the X-ray detector is configured to store a plurality of measurements obtained by the environmental sensor as environmental data and the processor is configured to generate a display signal for displaying the environmental data.

The environmental sensor may be configured to measure a single environmental parameter or it may be configured to measure multiple environmental parameters. The X-ray detector may comprise multiple environmental sensors each measuring different environmental parameters. In an alternative embodiment, the X-ray detector may comprise a first environmental sensor configured to measure a first environmental parameter and a second environmental sensor configured to measure one or more additional environmental parameters. Environmental factors can impact detector performance/accuracy. In some embodiments, the measurements taken by the environmental sensor(s) are stored in the non-volatile memory, so that the environmental data can be accessed even after the power supply to the X-ray detector has been switched off. In this way, it is possible to store a history of the environmental data at the X-ray detector. Further, it is possible for a user to access these measurements directly from the X-ray detector. The environmental parameter may be temperature, humidity or atmospheric pressure.

The environmental sensor may comprise a temperature sensor for measuring the temperature of the X-ray detector. The temperature sensor may be configured to measure the temperature whilst X-ray analysis measurements are carried out. The X-ray detector may be configured to measure and record temperature over an extended time period (for example, 1 month or 1 year). The X-ray detector may comprise multiple temperature sensors. In some embodiments, the X-ray detector may comprise a temperature sensor and/or a humidity sensor and/or a sensor for measuring atmospheric pressure.

The X-ray detector may further comprise a display device configured to display the image representing the X-ray intensity value. Preferably, the image is a graphical image. The display output of the X-ray detector communicates the display signal, generated by the processor, to the display device. Thereby, the display device displays the image representing the X-ray intensity value. The display device can be connected to the display output, so that it can receive the display signal from the processor and display the image representing the X-ray intensity value. The display device may also be configured to display the environmental data. The display device may be configured to display graphical and/or alphanumeric information. When the display device is configured to display a graphical image, it preferably comprises at least 128×64 pixels.

The display device may comprise a touch screen and/or a liquid crystal display. The touch screen may be configured to control the display device, e.g. to turn the display device on/off and/or to control the content displayed on the display device. For example, it may enable the user to scroll between multiple display screens displaying different content. When included, the liquid crystal display (LCD) device comprises an array of pixels. The size of the pixel array may be at least 5 $cm^2$. In preferred embodiments, the display device has at least 128×64 pixels.

The X-ray detector may comprise a housing containing the sensor, the readout circuit and the processor and wherein the display device is attached to the housing. In some embodiments, the display device may be integrated with the housing. In other embodiments, the display device may be removable from the housing. The sensor, readout circuit and processor may be contained inside the housing, and the display device may be attached to the outside of the housing.

The sensor may comprise an array of detection cells and may be configured to detect X-ray photons in a position sensitive manner. A one-dimensional array of detection cells is position sensitive in the direction of the array. A two-dimensional array is position sensitive in the two directions defining the array.

The processor may be configured to: determine a plurality of X-ray intensity values, each X-ray intensity value corresponding to a respective detection cell; and output an image representing the relative magnitude of the X-ray intensity values.

The X-ray detector may be a microstrip detector comprising multiple detection cells, each having a strip electrode. The relative magnitude is the relative magnitude of the X-ray intensity value compared to the values associated with the other detection cells in the image. The image may be an image of a sub-set of the detection cells. For example, it may be an image of detection cells in a central region of the sensor. The image of the central region of detection cells may assist in carrying out tilt calibration of the X-ray detector.

The processor may be configured to determine the total X-ray photon count received by the sensor. For example, the processor may be configured to sum the X-ray photon count output by the readout circuit, to determine the total X-ray photon count since the X-ray detector was first used. This may assist a user in determining the remaining lifetime of the sensor.

The processor may be configured to output an image representing this information, or alternatively the processor may be configured to determine the remaining sensor lifetime based on the value of the calculated total X-ray counts and to output an image representing the remaining sensor lifetime.

The X-ray detector may be a microstrip detector comprising a plurality of detection cells, each detection cell having a corresponding strip electrode.

The X-ray detector may be a solid-state detector.

The sensor may comprise a sensing element which may comprise a semiconductor. When an X-ray photon is incident on the sensing element, it generates a plurality of charge carriers. When an electric field is applied to the sensor, the charge carriers are driven towards an electrode.

The sensing element may comprise highly doped silicon. The sensor may be a silicon microstrip detector.

In an embodiment, there is provided an X-ray analysis apparatus comprising: an enclosure; an X-ray detector as described above; and a goniometer for supporting an X-ray source and the X-ray detector, wherein the goniometer and the X-ray detector are arranged inside the enclosure.

When the X-ray detector of the X-ray analysis apparatus comprises a display device, the display device is inside the enclosure.

The X-ray analysis apparatus may further comprise an X-ray source mounted to the goniometer, and an alignment adjustment mechanism for altering the position of the X-ray detector relative to the X-ray source.

The alignment adjustment member may comprise threaded members for fixing the X-ray detector or the X-ray source. The alignment adjustment mechanism may be operable to move the X-ray detector, or it may be operable to move the X-ray source. The alignment adjustment mechanism may comprise an X-ray source alignment arrangement and an X-ray detector alignment arrangement, to allow a user to independently adjust both the position of the X-ray source and the X-ray detector.

The enclosure may further comprise an X-ray protective viewing window. The X-ray protective viewing window may comprise lead glass.

According to another aspect of the invention, there is provided a method of using an X-ray analysis apparatus as described above, the method comprising: generating X-rays for irradiating the X-ray detector; receiving, at the X-ray detector, X-rays from the X-ray source; and displaying an image representing an X-ray intensity value.

The method may include receiving X-rays directly from the X-ray source, wherein the X-rays may form a line-shaped X-ray beam. Alternatively, the method may include irradiating a sample, wherein the X-ray detector receives X-rays from the X-ray source that have been diffracted by the sample.

The method may further comprise changing the position of the X-ray source or the X-ray detector based on the displayed image.

The method may further comprise determining a plurality of X-ray intensity values, each X-ray intensity value corresponding to a respective detection cell, and displaying an image representing the relative magnitude of the X-ray intensity values. The position of the X-ray source/X-ray detector may be adjusted based on the image representing the relative magnitude of the X-ray intensity values.

BRIEF DESCRIPTION OF THE DRAWINGS

Embodiments of the present invention will now be described, by way of example, with reference to the accompanying drawings, in which.

Figure 1:
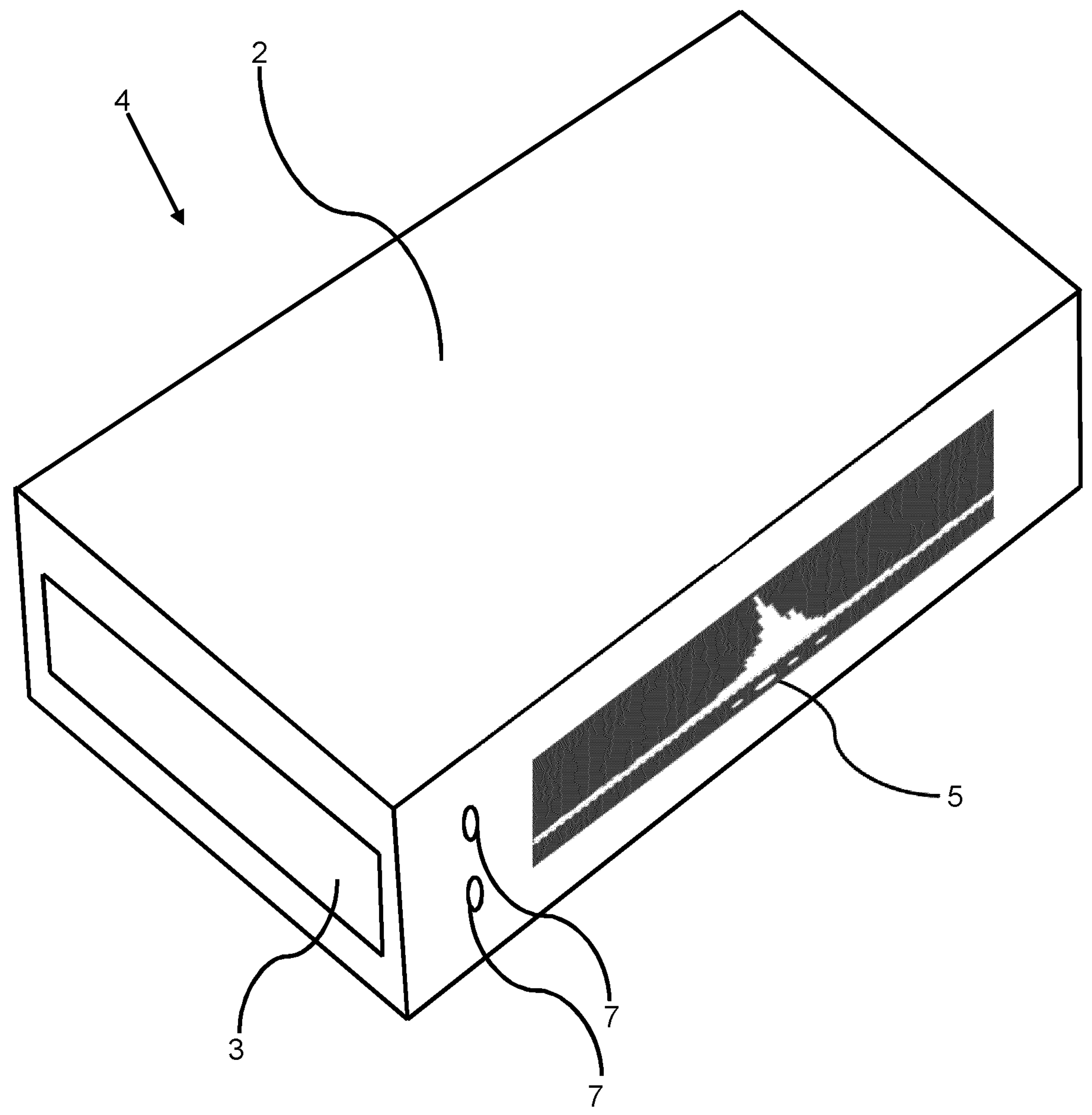
FIG. 1 is a schematic diagram illustrating an X-ray detector according to an embodiment of the invention, in a perspective view.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

FIG. 1 illustrates an X-ray detector for an X-ray diffraction analysis apparatus according to an embodiment of the invention.

The X-ray detector 4 comprises a housing 2 and a sensor (not shown) for sensing X-rays (i.e. an X-ray sensor), for example a solid-state X-ray sensor, arranged inside the housing 2. The X-ray detector 4 also comprises a display device 5. The display device 5 is a liquid crystal display (LCD), integrated with the housing 2.

In use, the X-ray detector is arranged to receive X-rays diffracted by a sample. The diffracted X-rays enter the X-ray detector through a detection window 3 and irradiate the X-ray sensor. The X-ray sensor comprises a semiconductor sensing element e.g. silicon. During operation, the sensing element is under bias, so that when an X-ray photon is incident on the sensing element, the sensing element generates an electrical pulse. The X-ray sensor outputs the electrical pulse, as a sensor output signal. By counting pulses output by the sensor, it is possible to calculate the intensity of diffracted X-rays (counts per second, cps).

Figure 4:
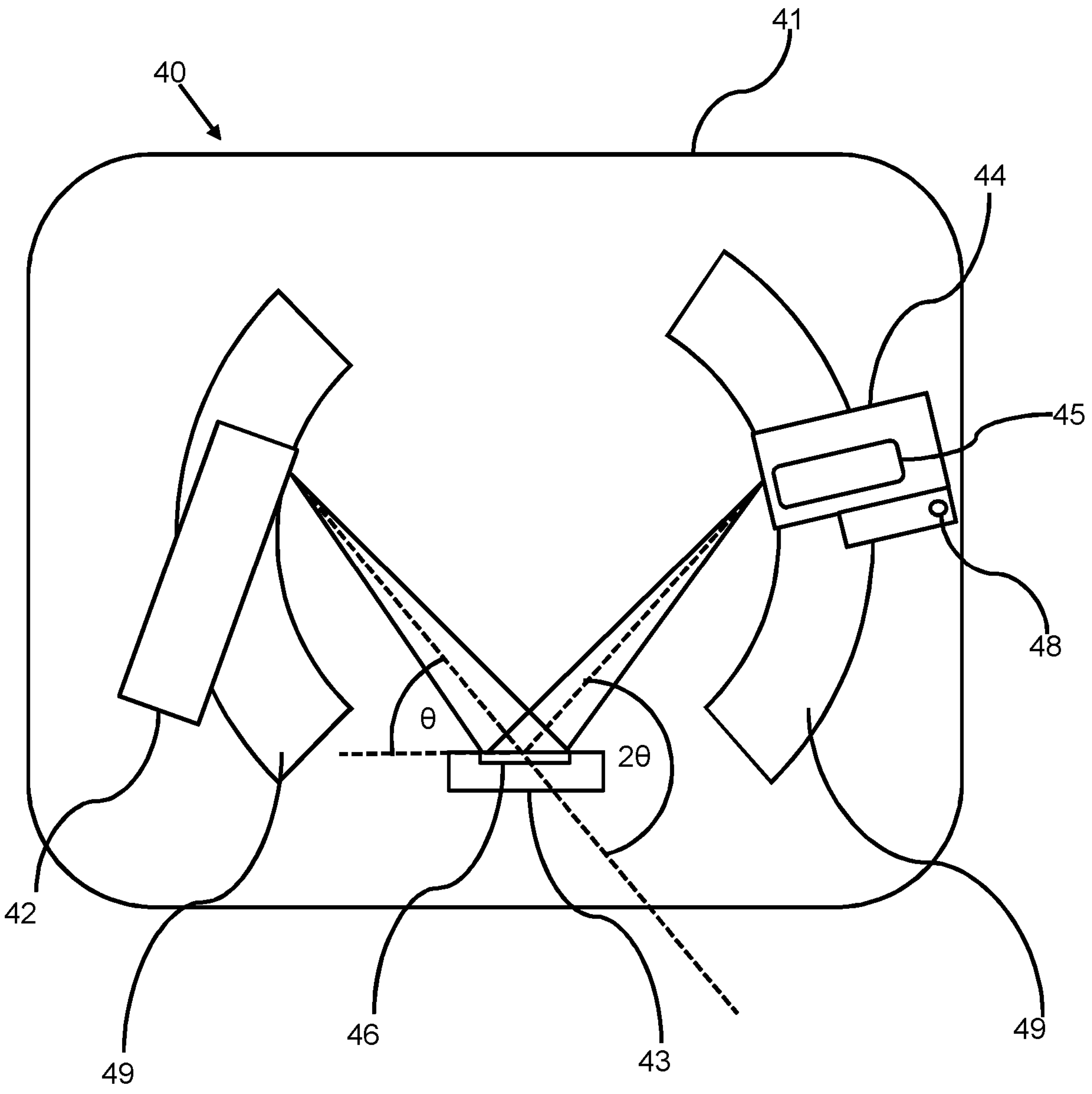
FIG. 4 is a schematic diagram illustrating an X-ray diffraction analysis apparatus according to an embodiment of the invention.

The X-ray detector comprises a readout circuit and a processor (neither are shown in FIG. 1). The readout circuit is configured to receive the sensor output signal from the sensor, to count electrical pulses (which represent X-ray photons) and to output an X-ray photon count (i.e. the readout circuit is configured to output the number of electrical pulses output by the sensor). The processor receives the X-ray photon count, calculates an X-ray intensity value based on the X-ray photon count, and stores the X-ray intensity value. This process is repeated as the X-ray detector is moved to different positions, in order to obtain X-ray intensity values at various diffraction angles. For example, during X-ray analysis of a sample using an X-ray analysis apparatus in reflection geometry, as the angle of the incident X-ray beam, $\theta$, relative to the surface of the sample is changed, the X-ray detector can also be moved through different $2\theta$ positions, where $2\theta$ is the angle between the incident X-ray beam and the diffracted X-rays (as illustrated in FIG. 4).

A display signal is generated, by the processor, based on stored X-ray intensity values. When the display device 5 receives the display signal, it displays an image representing the X-ray intensity values. For example, in FIG. 1, the display device shows an image showing relative X-ray intensity for a set of measurements spanning different $2\theta$ angles. Because the display signal is generated at the X-ray detector 4, rather than at a central X-ray analysis apparatus control system, it is possible to determine directly from the X-ray detector 4 whether the X-ray detector 4 is operating normally. Accordingly, in the event that an X-ray analysis apparatus is not functioning correctly, a user can quickly and conveniently determine whether the X-ray detector 4 is sensing X-rays. By comparison, in an X-ray analysis apparatus in which the X-ray detector is controlled by a centralised X-ray analysis control system, it might also be necessary to establish whether the connection between the X-ray detector and the centralised control system is working correctly, or whether another component is causing the centralised control system to malfunction, before it can be determined whether the X-ray detector is detecting X-rays.

The display device 5 can also display other types of information, in addition to X-ray diffraction measurement data. For example, the display device 5 may be configured to show information relating to the operating conditions, such as the ambient temperature, the relative humidity of the operating environment, and/or the atmospheric pressure. The X-ray detector 4 may comprise environmental sensors for obtaining this information, or it may obtain the information from an external source. In addition, the X-ray detector 4 may be configured to display information identifying the X-ray detector, error messages, information indicating whether the X-ray detector is connected to a computer network and/or information indicating an IP address to which the X-ray detector is connected, etc.

The display device 5 is configured to display various screens, which can be scrolled through using control buttons 7. Alternatively, the display device 5 may be a touchscreen, and the various screens can be scrolled through in response to a touch input.

Figure 2:
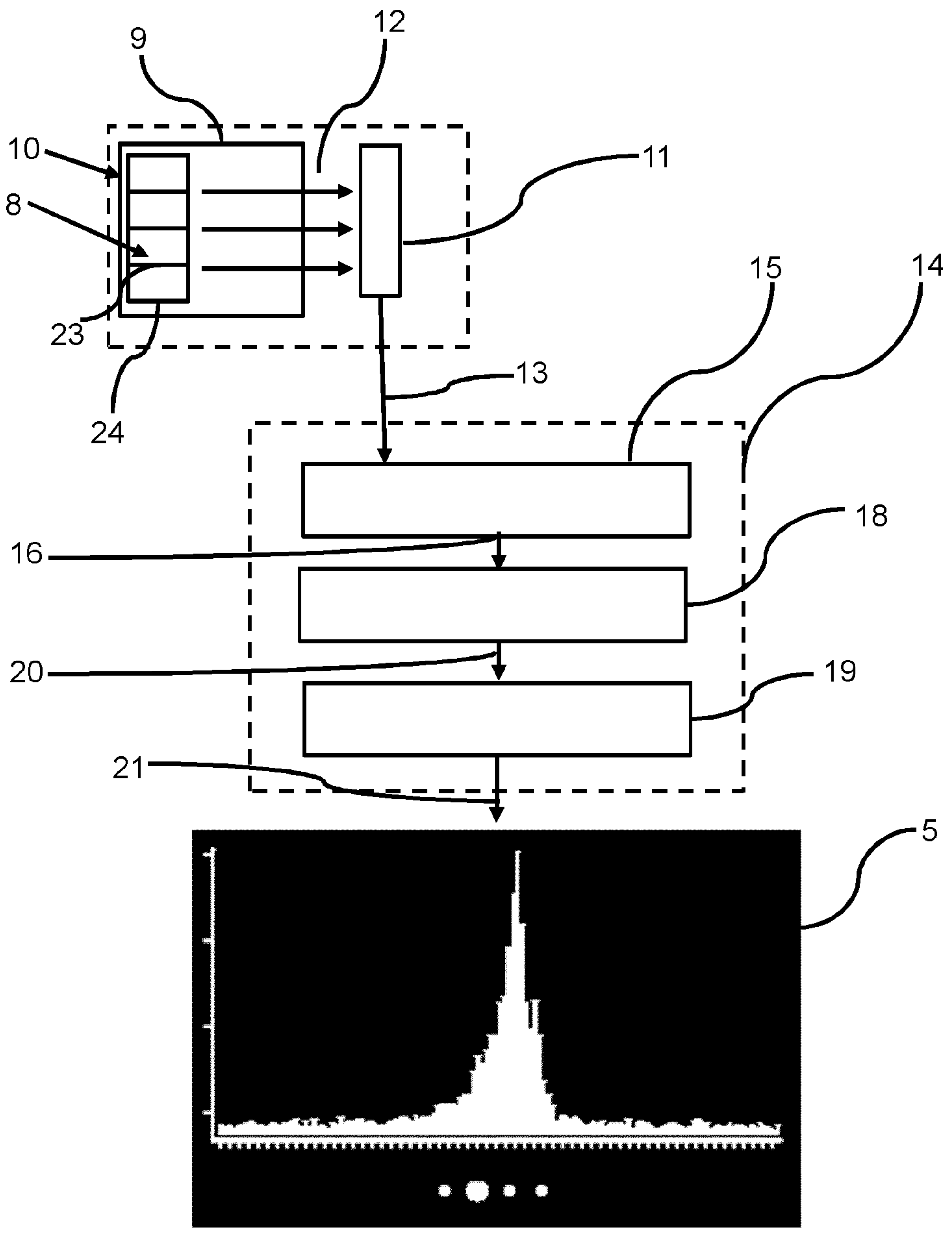
FIG. 2 is a schematic diagram illustrating the electronics of the X-ray detector of FIG. 1.

FIG. 2 is a schematic diagram illustrating sensing and processing electronics of the X-ray detector of FIG. 1.

The sensing electronics comprise an X-ray sensor 9 and a readout circuit 11 which comprises a counter for counting X-ray photons incident on a sensing element 10 of the X-ray sensor 9.

The sensing element 10 comprises a linear array of detection cells 8. In an embodiment, the X-ray detector is a microstrip X-ray detector. The sensing element 10 comprises a body 24 of semiconductor material with strip-shaped electrodes 23 in a linear array on a surface of the body 24. Each detection cell 8 comprises a respective strip electrode 23.

In response to a detection cell 8 of the X-ray sensor 9 being irradiated by an X-ray photon, the sensor 9 outputs a sensing signal 12. The sensing signal is a transient current pulse, caused by the flow of free charge in the sensing element (under bias) generated by the X-ray photon. The readout circuit 11 comprises electronics for converting the current pulse generated by the X-ray photon into a voltage pulse proportional to the time integral of the current pulse (and thus proportional to the X-ray photon energy). To determine whether the pulse corresponds to an X-ray photon, the voltage pulse is sent to a comparator arrangement configured to determine if the pulse is within a predefined energy window. If the amplitude of the voltage pulse (which corresponds to the energy of the X-ray photon) is larger than a first threshold value, and below a second threshold value, the counter adds a count of one. The readout circuit outputs the X-ray photon count 13 for each detection cell, for example every 320 nanoseconds.

The processor 14 receives the X-ray photon count 13 for each detection cell 8 and determines, at X-ray intensity calculator 15, an X-ray intensity value 16 based on the total X-ray photon count and the rate at which the readout circuit 11 outputs the X-ray photon count 13. As the X-ray detector 4 moves over the angular measurement range of the X-ray diffraction measurement, X-ray intensity values corresponding to various angular positions are stored in memory 18.

One benefit of using a microstrip detector is that it is possible to measure multiple 2θ angles at the same time. As the X-ray detector moves through the 2θ arc, the detection cells (or "strips") pass through the 2θ positions to be measured (e.g. 0 to 60 degrees). The measurement obtained by each detection cell whilst it is in a particular 2θ position contributes to the final measurement for that position. For example, while the X-ray detector is moving, X-ray intensity is measured at a 2θ angle (e.g. 15 degrees) in a first strip (in a first measurement cycle). When an adjacent strip moves into the 15 degrees 2θ position, it measures X-ray intensity (in a second measurement cycle). This continues for a third strip, and subsequent strips.

The image generator 19 receives X-ray intensity data 20 from the memory 18 and generates a display signal 21 for displaying an image representing the X-ray intensity values. For example, the image may show the relative X-ray intensity values (in cps) against an axis (which, when the angular position of the X-ray detector is changed during the measurement, may represent the 2θ position of the X-ray detector). The display device 5 receives the display signal 21 output by the image generator, and displays the image. The image generator 19 may generate a new image as the measurement is carried out. For example, the image generator 19 may generate a new image each time a new X-ray intensity value is calculated, to update the image. In this way, the X-ray measurement data can be viewed in "real-time". Alternatively, the image generator 19 may generate a new image less frequently, for example every second. In embodiments in which the X-ray detector is a microstrip detector, the image generator 19 may generate a new image after a predetermined number of measurement cycles e.g. every 5-10 measurement cycles. Once the measurement has been completed, the image generator 19 may generate a display signal for displaying the results together with a message indicating that the measurement has been completed.

In an alternative embodiment, the image generator 19 may only generate the image after the measurement has been completed (i.e. once X-ray intensity values have been obtained across the angular range of the measurement). In this case, the image displaying the measurement results may also include a message indicating that the measurement has been completed.

The processor 14 may also be configured to identify operating errors, and to display information identifying these errors on the display device 5. For example, if a connection to the X-ray detector 4 from another component of the X-ray analysis apparatus is compromised, the X-ray detector's display device 5 may display an error message indicating that there is a connection error. These error messages may be stored in a non-volatile memory of the X-ray detector 4, and the image generator 19 may be configured to generate a display signal for displaying an image representing the error messages on the display device.

The processor 14 may be configured to measure the leakage current of each detection cell of the sensor during power-on, and to output this information to the image generator 19. The image generator 19 may receive the leakage current information and generate a display signal for displaying an image representing this information on the display device 5.

Figure 3:
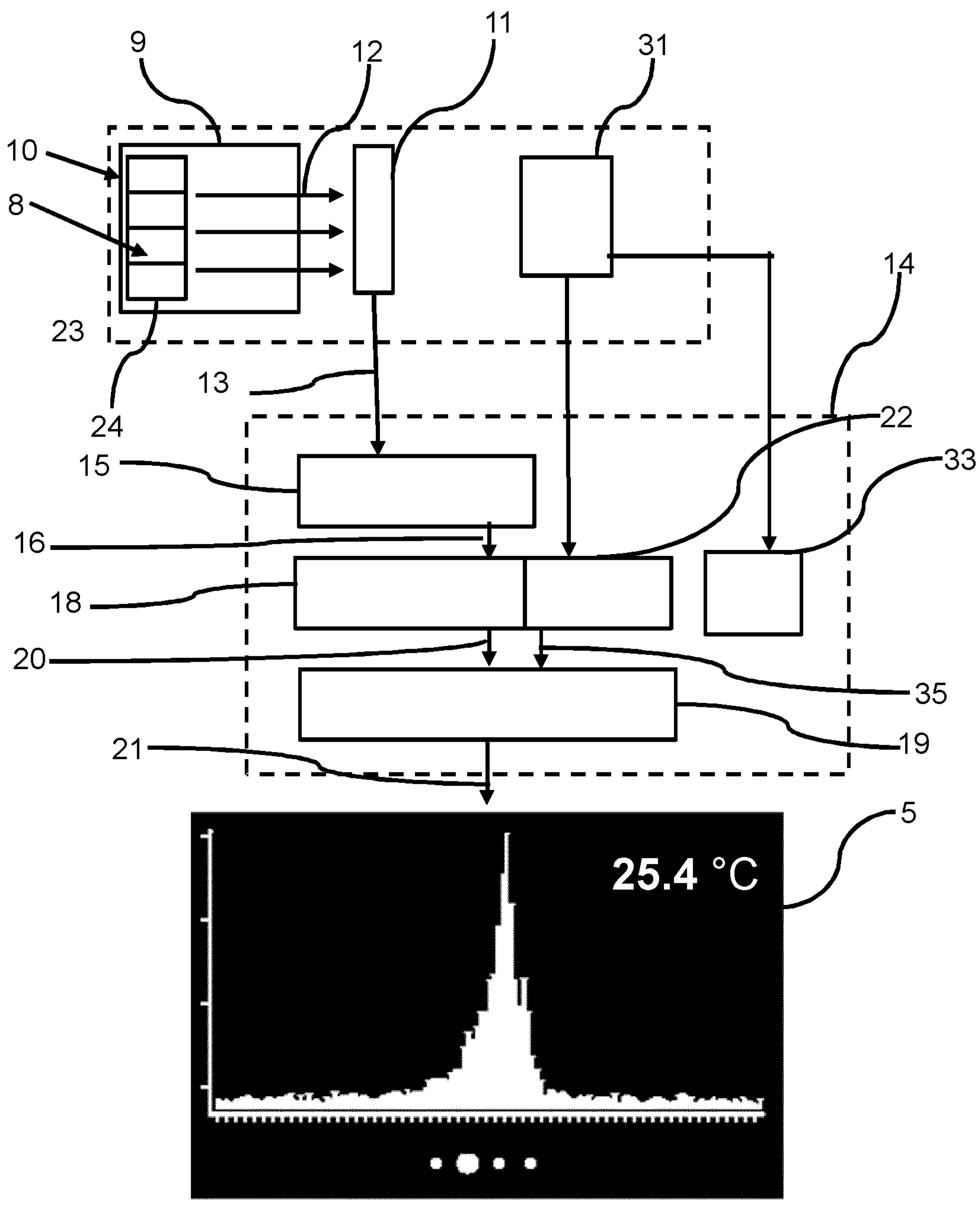
FIG. 3 is a schematic diagram illustrating the electronics of an X-ray detector according to another embodiment of the invention.

FIG. 3 is a schematic diagram illustrating sensing and processing electronics of an X-ray detector 4 according to another embodiment of the invention. In this embodiment, the X-ray detector comprises the sensing and processing electronics described above in relation to FIG. 2. Additionally, the X-ray detector 4 comprises an environmental sensor, in this embodiment shown as temperature sensor 31, and a temperature stabilisation control circuit 33. The temperature sensor 31 is arranged to measure the temperature of the X-ray sensor 10.

The temperature sensor 31 outputs a temperature reading, which is stored in a non-volatile memory 22. The image generator 19 is configured to receive temperature readings from the non-volatile memory 22 and to generate a display signal (not shown), for displaying the temperature readings. By storing temperature readings in the non-volatile memory 22 of the X-ray detector, and providing an image generator 19 configured to generate a display signal for displaying the temperature readings, it is possible to access a temperature history record of the X-ray detector directly from the X-ray detector. This can assist a user in diagnosing issues with the X-ray detector.

The image generator 19 may be configured to display information relating to the current temperature of the X-ray detector. It may be configured to indicate whether the current temperature is within the desired range. For example, by displaying an icon indicating if the temperature is outside or inside of the desired range, or by displaying the temperature in a different colour if the temperature is outside of the desired range as compared to when the temperature is within the desired range.

Temperature stabilisation circuit 33 is configured to receive a temperature reading from the temperature sensor, and to processes it to determine whether the temperature is within a pre-defined range—for example 24 to 25° C.

The temperature stabilisation circuit comprises a fan and a Peltier element. If the temperature reading is too high, the temperature stabilisation circuit 33 sends a control signal to the fan and/or Peltier to cool the X-ray detector. If the temperature reading is too low the temperature stabilisation circuit 33 sends a control signal to the Peltier element to heat the X-ray detector. By stabilising the temperature of the X-ray detector in this way, X-ray diffraction results obtained by the X-ray detector are more reliable.

FIG. 4 illustrates an X-ray diffraction analysis apparatus 40 according to an embodiment of the invention, in cross section. The X-ray diffraction analysis apparatus 40 comprises an enclosure 41 housing an X-ray source 42, a sample holder 43 holding a sample 46 and an X-ray detector 44. The enclosure is constructed using X-ray absorbent material, so that X-rays are prevented from escaping the enclosure during operation. The enclosure may comprise a door for accessing the enclosure. When the door is open (i.e. the enclosure is in an open configuration), a user can insert the sample 46, and reposition any of the X-ray analysis apparatus components. In a closed configuration, the user is prevented from accessing the enclosure, and X-rays are prevented from escaping the enclosure.

The enclosure may comprise a window (not shown) that is opaque to X-rays, but allows a user to view the X-ray analysis apparatus even when the enclosure is closed As shown in FIG. 4, the X-ray source 42 and the X-ray detector 44 are mounted to the goniometer 49. The X-ray detector is mounted to the goniometer by alignment adjustment member 48. The X-ray detector is mounted to a stage for supporting the X-ray detector, and the stage is mounted to the goniometer by screws 48, to allow adjustment of the position of the X-ray detector.

In use, the X-ray source 42 irradiates the sample 46 with X-rays at an angle, θ, to the surface of the sample. X-rays are diffracted by the sample 46, and are received at the X-ray detector 44, which is positioned by the goniometer at the 2θ position (i.e. the X-ray detector is able to receive X-rays diffracted at an angle 2θ, wherein 2θ is the angle between the incident X-ray and the diffracted X-ray). The X-ray detector 44 detects the X-rays and generates an image showing X-ray intensity data, which is displayed on the integrated display 45.

In order to obtain accurate and repeatable results, it is important that the X-ray detector 44 and the X-ray source 42 are properly aligned, before carrying out measurements on a sample. To align the X-ray source 42 and the X-ray detector 44, the X-ray source 42 is arranged to irradiate the X-ray detector 44 with the X-ray source operated in a line focus mode (i.e. the X-ray beam, as seen at the sample, is linear). In this way, the X-ray source 42 irradiates a rectangular area of the X-ray detector's sensor. If the X-ray detector 44 and X-ray source 42 are well aligned, the measured X-ray intensity in two consecutive detection cells are substantially the same.

FIG. 5 illustrates how an image displayed on the display device can assist with aligning the X-ray source and the X-ray detector. In this example, the X-ray detector comprises a two-dimensional array of detection cells 50. The X-ray detector is accordingly "two dimensional" ("2D"); it is position sensitive in two directions (in the directions which the detection cells are arranged).

Figures 5A, 5B, 5C, 5D:
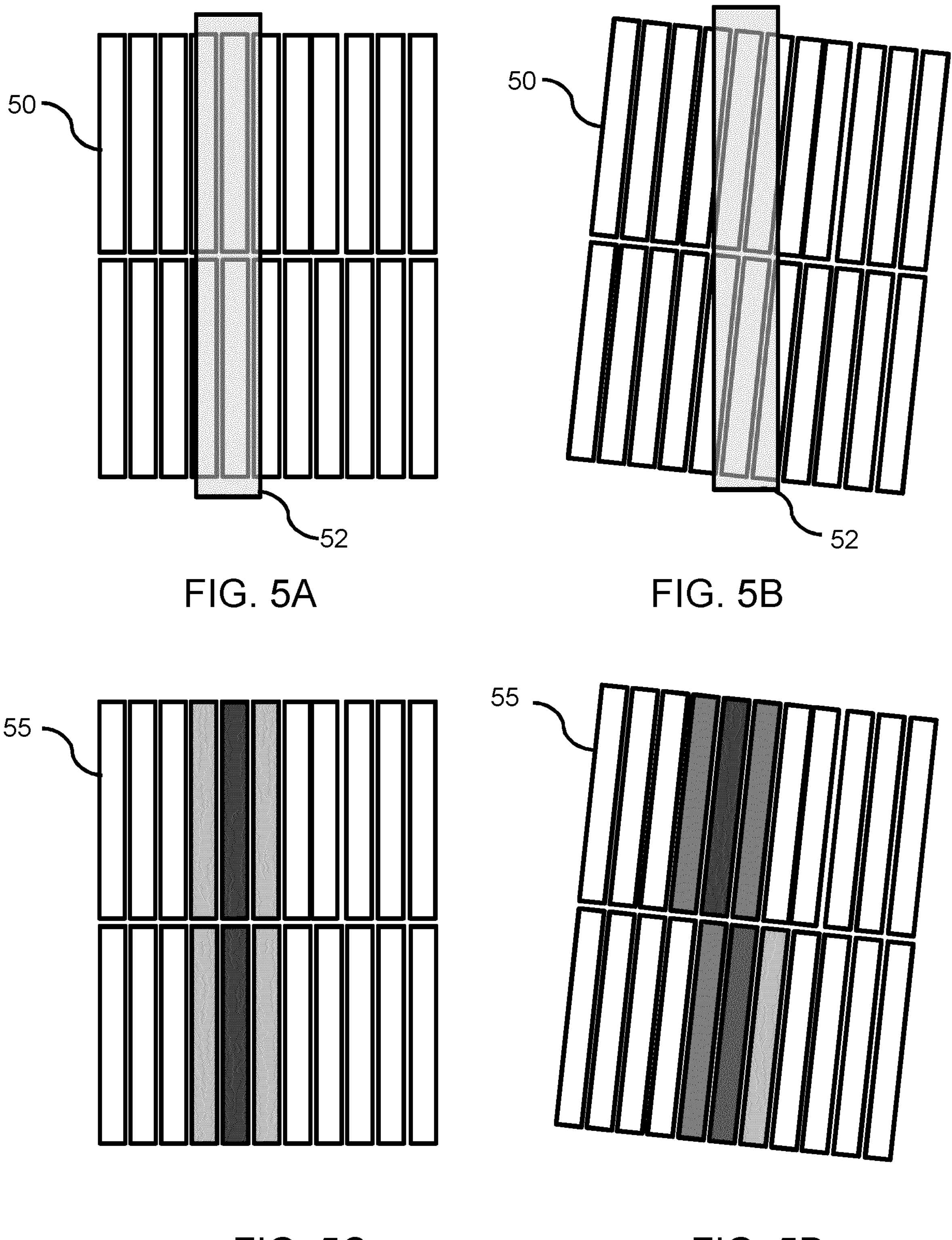
FIGS. 5A-D schematically illustrate an array of detection cells and corresponding images representing X-ray intensity values measured by the detection cells for two different X-ray detector alignments.

FIG. 5A shows an array of detection cells 50, irradiated by an X-ray beam 52, when the X-ray detector and the X-ray source are well aligned.

FIG. 5B shows an array of detection cells 50, irradiated by an X-ray beam 52, when the X-ray detector and the X-ray source are not well aligned.

FIG. 5C shows an image displayed on the X-ray detector's display, based on the intensity measurements that would be obtained in FIG. 5A. In the image, the detection cells are each represented by rectangles 55. The magnitude of the intensity measurement corresponding to the detection cell is represented by a colour/shade. In FIG. 5C, the detection cells that appear darkest represent high X-ray intensity values, and the lighter detection cells represent relative low X-ray intensity values. In FIG. 5C, which shows a well-aligned detector, the intensity pattern is symmetric and decreases from the central detection cells.

FIG. 5D shows an image displayed on the X-ray detector's display, based on the intensity measurements that would be obtained in FIG. 5B. In FIG. 5D, the intensity pattern is not symmetric, and includes a wider range of intensities.

Figure 6:
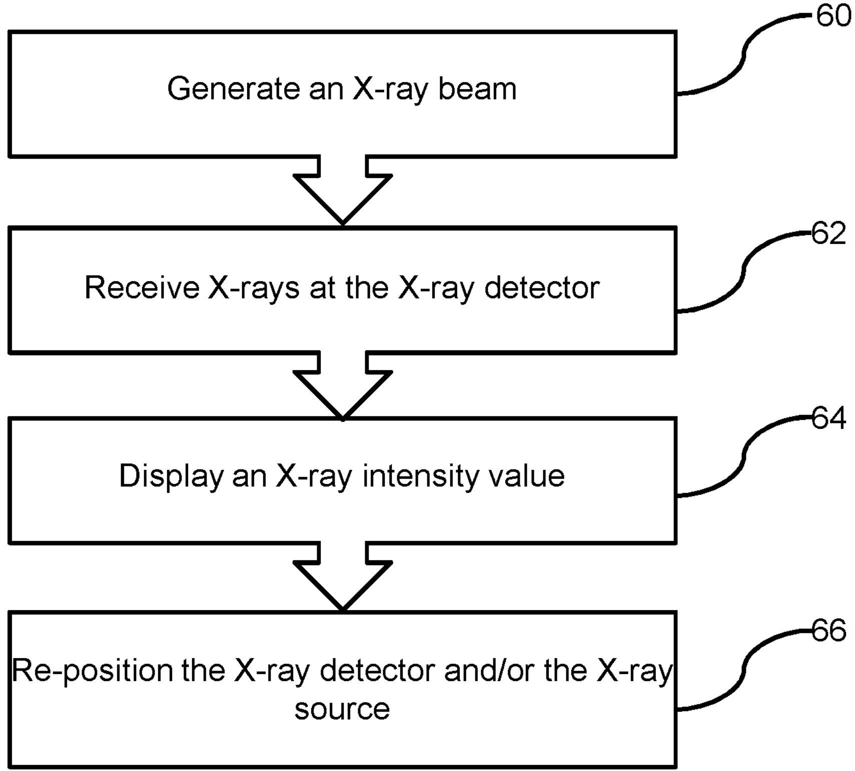
FIG. 6 is a schematic diagram illustrating a method of using an X-ray diffraction analysis apparatus.

FIG. 6 illustrates a method of using an X-ray analysis apparatus according to an embodiment of the invention. In this embodiment, the X-ray detector comprises a two-dimensional linear array of detection cells. In an irradiation step 60, an X-ray source generates an X-ray beam for irradiating the X-ray detector. In a detection step 62, the X-ray detector receives X-rays from the X-ray source. The X-ray detector determines an X-ray intensity value associated with each detection cell, and generates a display signal for displaying an image representing the X-ray intensity values. For example, the X-ray detector may generate an image representing the detection cells of the X-ray detector, in which an intensity value associated with each detection cell is represented on the image of the detection cell. For example, the image may represent the relative intensity values of the detection cells. In a display step 64, the X-ray detector displays the image. If the X-ray intensity values associated with the detection cells indicates that the X-ray detector is not well-aligned, the position of the X-ray detector should be adjusted. This adjustment may be carried out, in an alignment step 66, by altering the position of the X-ray detector and/or the X-ray source.

In some embodiments, the sensing element may not comprise silicon. It may instead comprise, for example, cadmium telluride, or any other material capable of sensing X-rays.

In some embodiments, the X-ray detector may not be a microstrip detector. In at least some of these embodiments, the detection cells are pixels (square-shaped detection cells) of the X-ray detector.

In some embodiments, the X-ray detector is a one dimensional X-ray detector. In other embodiments, the X-ray detector is a two dimensional X-ray detector, comprising a two dimensional array of detection cells. For example, where the X-ray detector is a microstrip detector it may comprise an array of 2×n detection cells (wherein n≥2). For example, the X-ray detector may comprise an array of 2×128 detection cells.

In some embodiments, the X-ray detector may comprise a two dimensional array of detection cells, wherein the X-ray detector is configured to control the detection cells such that only a subset of the detection cells are active. In this way, the X-ray detector can be operated in a one-dimensional manner, or a zero-dimensional manner.

In some embodiments, the display device may not be integrated with the X-ray detector housing. Instead, the display device may be attachable to the X-ray detector housing. Alternatively, the display device may be separate to the X-ray detector and can be connected to the display output of the X-ray detector by a wired or wireless connection.

In some embodiments, the display signal may cause the display device to display an alphanumeric image.

Additionally, or alternatively, the image generator may be configured to generate a graphical image, and the display device may be configured to display the graphical image.

The display device may comprise an array of at least 128×64 pixels. The pixel array may cover an area of at least 5 $cm^2$ and preferably less than 50 $cm^2$.

In some embodiments, the display device comprises a thin film transistor LCD display (TFT LCD). In some embodiments, the display device does not is not an LCD-type display device. It may alternatively be any other type of display device. For example, an LED display device e.g. an OLED display device.

In some embodiments, the environmental sensor is not a temperature sensor. It may instead be any type of sensor for sensing environmental operating conditions, such as a humidity sensor or an atmospheric pressure sensor.

In some embodiments, the display device is a touch screen. Accordingly, the display device may be configured to receive user inputs by detecting a user's touch. For example, the display device may include a capacitive touch button at a scrolling location on the screen. In that case, the display device is configured to scroll between screens when the user touches the scrolling location.

It should be noted that the above-mentioned examples illustrate rather than limit the invention, and that those skilled in the art will be able to design many alternative examples without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The examples may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Furthermore in general, the various examples may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Examples as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The invention claimed is:

1. An X-ray detector for an X-ray diffraction analysis apparatus, the X-ray detector comprising:
- a sensor for converting an X-ray photon incident on the sensor into a sensor output signal;
- a readout circuit configured to determine an X-ray photon count, by counting the sensor output signal;
- a processor configured to:
  - determine an X-ray intensity value using the X-ray photon count;
  - generate a display signal for displaying an image representing the X-ray intensity value; and
  - communicate the display signal to a display device for displaying the image representing the X-ray intensity value; and
- a housing containing the sensor, the readout circuit and the processor, wherein the display device is attached to the housing.

2. The X-ray detector of claim 1, further comprising:
- an environmental sensor configured to measure an environmental parameter; and
- a non-volatile memory, wherein the X-ray detector is configured to store a plurality of measurements obtained by the environmental sensor as environmental data and the processor is configured to generate a display signal for displaying the environmental data.

3. The X-ray detector of claim 1 wherein the display device displays the image representing the X-ray intensity value.

4. The X-ray detector of claim 1, wherein the sensor comprises an array of detection cells and is configured to detect X-ray photons in a position sensitive manner.

5. The X-ray detector of claim 1, wherein the sensor is a microstrip detector comprising a plurality of detection cells, each detection cell having a corresponding strip electrode.

6. The X-ray detector of claim 1, wherein the X-ray detector is a solid-state detector.

7. An X-ray analysis apparatus comprising:
- an enclosure;
- the X-ray detector according to claim 1; and
- a goniometer for supporting an X-ray source and the X-ray detector, wherein the goniometer and the X-ray detector are arranged inside the enclosure.

8. The X-ray detector of claim 2, wherein the environmental sensor comprises a temperature sensor for measuring the temperature of the X-ray detector.

9. The X-ray detector of claim 3, wherein the display device is a touchscreen and/or a liquid crystal display device.

10. The X-ray detector of claim 3, wherein the image is a graphic image.

11. The X-ray detector of claim 4, wherein the processor is configured to:
- determine a plurality of X-ray intensity values, each X-ray intensity value corresponding to a respective detection cell; and
- output an image representing the relative magnitude of the X-ray intensity values.

12. The X-ray analysis apparatus of claim 7 further comprising an X-ray source mounted to the goniometer, and an alignment adjustment mechanism for altering the position of the X-ray detector relative to the X-ray source.

13. The X-ray analysis apparatus of claim 7, wherein the enclosure further comprises an X-ray protective viewing window.

14. A method of using the X-ray analysis apparatus according to claim 7, the method comprising:

generating X-rays for irradiating the X-ray detector;

receiving, at the X-ray detector, X-rays from the X-ray source; and displaying an image representing an X-ray intensity value.

15. The method of claim 14, further comprising changing the position of the X-ray source or the X-ray detector based on the displayed image.

* * * * *